United States Patent
Schäfer et al.

(10) Patent No.: US 12,122,512 B2
(45) Date of Patent: Oct. 22, 2024

(54) METHOD FOR AUTONOMOUS IN-FLIGHT TRANSFER OF A LOAD FROM A FIRST AERIAL VEHICLE TO A SECOND AERIAL VEHICLE, SYSTEM COMPRISING A FIRST AERIAL VEHICLE AND A SECOND AERIAL VEHICLE, AND AERIAL VEHICLES

(71) Applicant: Sony Group Corporation, Tokyo (JP)

(72) Inventors: Henrik Schäfer, Stuttgart (DE); Florian Becker, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 62 days.

(21) Appl. No.: 17/631,893

(22) PCT Filed: Jul. 28, 2020

(86) PCT No.: PCT/EP2020/071244
§ 371 (c)(1),
(2) Date: Feb. 1, 2022

(87) PCT Pub. No.: WO2021/037463
PCT Pub. Date: Mar. 4, 2021

(65) Prior Publication Data
US 2022/0289375 A1    Sep. 15, 2022

(30) Foreign Application Priority Data

Aug. 23, 2019 (EP) ...................... 19193357

(51) Int. Cl.
 B64C 39/02    (2023.01)
 B64C 1/06    (2006.01)
 (Continued)

(52) U.S. Cl.
 CPC ............ *B64C 39/024* (2013.01); *B64C 1/061* (2013.01); *B64C 37/02* (2013.01); *B64D 1/02* (2013.01);
 (Continued)

(58) Field of Classification Search
None
See application file for complete search history.

(56) References Cited

U.S. PATENT DOCUMENTS 9,630,712 B1 * 4/2017 Carmack ................. B64C 27/08
2002/0074454 A1  6/2002 Henderson
(Continued)

FOREIGN PATENT DOCUMENTS

DE   102018203385 A1 * 9/2019
JP   2018-505094 A    2/2018
(Continued)

OTHER PUBLICATIONS

English translation of DE_102018203385 (Year: 2019).*
(Continued)

*Primary Examiner* — Peter D Nolan
*Assistant Examiner* — Michael F Whalen
(74) *Attorney, Agent, or Firm* — XSENSUS LLP

(57) ABSTRACT

A method for autonomous in-flight transfer of a load from a first Aerial Vehicle, AV, to a second AV is provided. Each of the first AV and the second AV includes a frame with a vertical opening for receiving the load. A plurality of rotors are attached to the frame. The method comprising autonomously performing the following in-flight: fastening means of the first AV hold the load in the vertical opening of the first AV such that a bottom end of the load is accessible by the second AV; the second AV approaches the first AV from below in order to couple a fastening means of the second AV to the bottom end of the load; the fastening means of the first
(Continued)

AV releases the load after the fastening means of the second AV couples to the bottom end of the load; and the fastening means of the second AV lower the load with respect to the frame of the second AV in order to move the load into a flight position.

19 Claims, 8 Drawing Sheets

(51) Int. Cl.
    *B64C 37/02*     (2006.01)
    *B64D 1/02*     (2006.01)
    *G05D 1/00*     (2006.01)
    *B64U 30/20*     (2023.01)
    *B64U 101/20*     (2023.01)
    *B64U 101/60*     (2023.01)

(52) U.S. Cl.
    CPC ............. *G05D 1/104* (2013.01); *B64U 30/20* (2023.01); *B64U 2101/20* (2023.01); *B64U 2101/60* (2023.01); *B64U 2201/10* (2023.01)

(56) References Cited

U.S. PATENT DOCUMENTS

| | | |
|---|---|---|
| 2006/0202088 A1 | 9/2006 | Padan |
| 2012/0137862 A1* | 6/2012 | Kossett .................. F41H 11/16 89/1.13 |
| 2016/0304217 A1 | 10/2016 | Fisher et al. |
| 2018/0032090 A1 | 2/2018 | Vander Lind et al. |
| 2018/0074523 A1 | 3/2018 | Cantrell et al. |
| 2018/0086460 A1 | 3/2018 | Beaman et al. |
| 2018/0276993 A1 | 9/2018 | Chow et al. |
| 2019/0084432 A1* | 3/2019 | Liang ..................... B64U 30/20 |
| 2019/0100307 A1* | 4/2019 | Beltman ................. G05D 1/104 |
| 2019/0202563 A1* | 7/2019 | Wiggerich .............. B64C 37/02 |

FOREIGN PATENT DOCUMENTS

| | | |
|---|---|---|
| JP | 2019085104 A | 6/2019 |
| KR | 20110122469 A | 11/2011 |
| WO | 2016/022646 A1 | 2/2016 |

OTHER PUBLICATIONS

International Search Report and Written Opinion mailed on Oct. 1, 2020, received for PCT Application PCT/EP2020/071244, Filed on Jul. 28, 2020, 9 pages.

Williams, "Drones that Pass Packages to Each Other could be the Future of Home Delivery", Mashable, Apr. 27, 2017, 15 pages.

* cited by examiner

METHOD FOR AUTONOMOUS IN-FLIGHT TRANSFER OF A LOAD FROM A FIRST AERIAL VEHICLE TO A SECOND AERIAL VEHICLE, SYSTEM COMPRISING A FIRST AERIAL VEHICLE AND A SECOND AERIAL VEHICLE, AND AERIAL VEHICLES

CROSS-REFERENCE TO RELATED APPLICATIONS

The present application is based on PCT/EP2020/071244 filed on Jul. 28, 2020, and claims priority to EP 19193357.1 filed on Aug. 23, 2019, the entire contents of each are incorporated herein by reference.

FIELD

Examples relate to load swapping between Aerial Vehicles (AVs). In particular, examples relate to a method for autonomous in-flight transfer of a load from a first AV to a second AV, a system comprising a first AV and a second AV, and AVs.

BACKGROUND

AVs such as Unmanned Aerial Vehicles (UAVs) play an important role in the transportation of goods and people, and open many possibilities for remote sensing. However, the amount of time a battery powered AV can remain airborne is still a weakness of the technology. Typically, a battery power vehicle may achieve an increased range or operating time with a larger battery. However, the size of the battery is a major cost factor and additionally impacts the weight of the device and, hence, the transportable payload of the vehicle. Recharging or switching the battery during a stop would drastically increase the travel/delivery time for an AV.

Another approach for extending the travelling/delivery range is to exchange a payload between multiple AVs. However, exchanging the payload requires a well-planned swap procedure.

Hence, there may be a demand for a safe transfer of a load from a first AV to a second AV.

SUMMARY

This demand is met by apparatuses and methods in accordance with the independent claims. Advantageous embodiments are addressed by the dependent claims.

According to a first aspect, the present disclosure provides a method for method for autonomous in-flight transfer of a load from a first AV to a second AV. Each of the first AV and the second AV comprises a frame with a vertical opening for receiving the load. A plurality of rotors are attached to the frame. The method comprising autonomously performing the following in-flight: fastening means of the first AV hold the load in the vertical opening of the first AV such that a bottom end of the load is accessible by the second AV; the second AV approaches the first AV from below in order to couple a fastening means of the second AV to the bottom end of the load; the fastening means of the first AV releases the load after the fastening means of the second AV couples to the bottom end of the load; and the fastening means of the second AV lower the load with respect to the frame of the second AV in order to move the load into a flight position.

According to a second aspect, the present disclosure provides a system comprising a first AV and a second AV. Each of the first AV and the second AV comprises a frame with a vertical opening for receiving a load. A plurality of rotors are attached to the frame. Each of the first AV and the second AV comprises a control circuit configured to control a respective one of the first AV and the second AV to autonomously perform the following in-flight: fastening means of the first AV hold the load in the vertical opening of the first AV such that a bottom end of the load is accessible by the second AV; the second AV approaches the first AV from below in order to couple a fastening means of the second AV to the bottom end of the load; the fastening means of the first AV releases the load after the fastening means of the second AV couples to the bottom end of the load; and the fastening means of the second AV lower the load with respect to the frame of the second AV in order to move the load into a flight position.

According to a third aspect, the present disclosure provides an AV. The AV comprises a frame with a vertical opening for receiving a load, and a plurality of rotors attached to the frame. Further, the AV comprises a plurality of rotatable worm screws arranged in the frame. The worm screws are capable of engaging with a plurality of gear racks of the load for securing the load. Additionally, the AV comprises at least one controllable drive for the plurality of rotatable worm screws. The drive is configured to rotate the plurality of rotatable worm screws for adjusting a vertical position of the load with respect to the frame.

According to a fourth aspect, the present disclosure provides another AV. The AV comprises a frame with a vertical opening for receiving a load, and a plurality of rotors attached to the frame. Further, the AV comprises a plurality of bolts attached to side walls of the vertical opening. The bolts are capable of engaging with a respective notch in cylinder surfaces of a plurality of cylinders of the load for securing the load. The cylinders of the load are rotatable by the bolts by applying a force along the cylinder axes.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
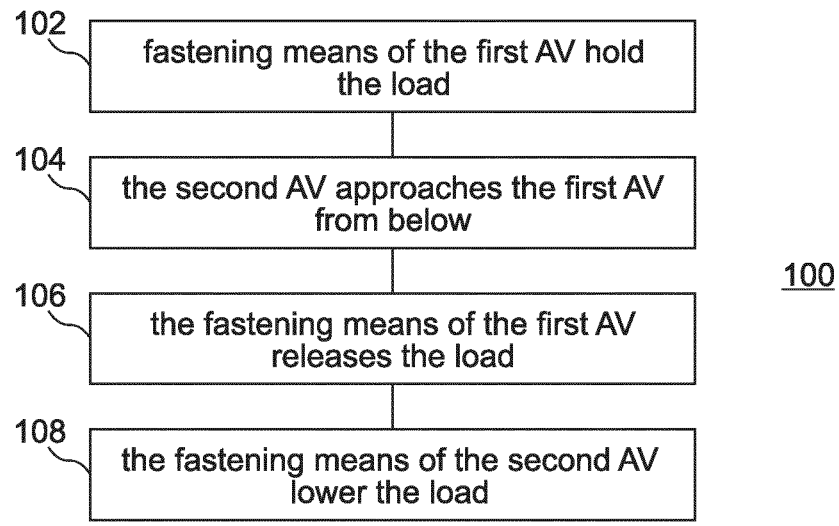
FIG. 1 illustrates a flowchart of an example of a method for autonomous in-flight transfer of a load from a first AV to a second AV.

FIG. 1 illustrates a flowchart of a method 100 for autonomous in-flight transfer of a load from a first (e.g. battery powered) AV to a second (e.g. battery powered) AV. That is, the method 100 is for transferring the load from the first AV to the second AV while both AVs are airborne. The transfer of the load from the first AV to the second AV is done autonomous, i.e. without outside control of, e.g., an external control center or a human pilot. In some examples, the first AV and the second AV are UAVs. In other examples, at least one of the first AV and the second AV may be manned.

Each of the first AV and the second AV comprises a frame (body) with a vertical opening for receiving the load. In other words, a vertical recess is formed in the frame that allows to accommodate a load. For each of the first and the second AV, a plurality of rotors (i.e. two or more rotors) are attached to the frame for propulsion of the AV.

Figure 2:
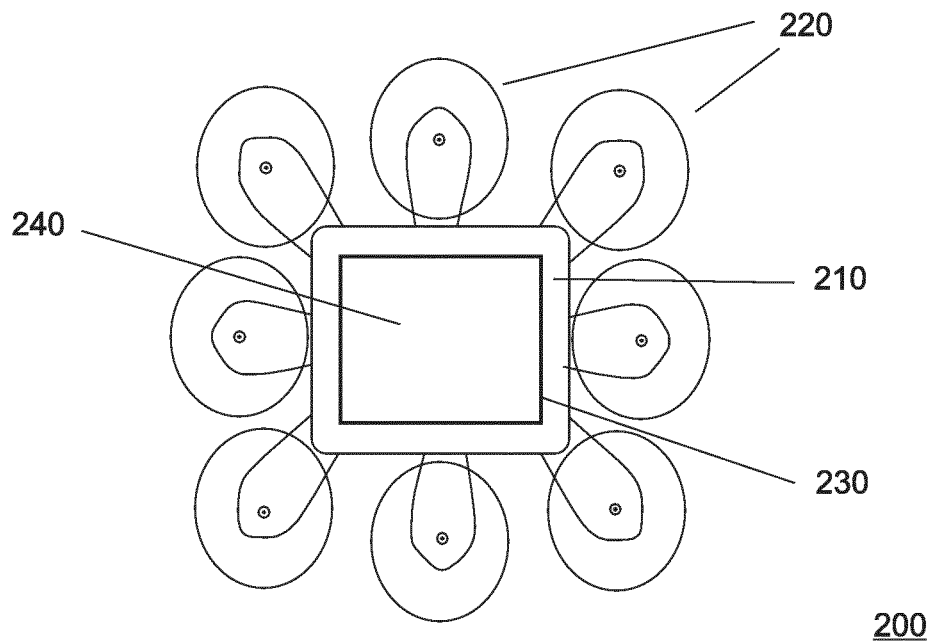
FIG. 2 illustrates a top view of an example of a UAV.

A top view of an exemplary UAV 200 that may be used for the first AV and the second AV is illustrated in FIG. 2. The UAV 200 acts as a carrier vehicle for the (pay-)load 240. The UAV 200 comprises a substantially rectangular frame (body) 210. In other words, the UAV 200 comprises a frame-like body. The system components (e.g. control circuitry, communication circuitry, etc.) of the UAV 200 are implemented in the frame 210. A substantially rectangular recess (opening) 230 is formed along the vertical axis in (e.g. the center of) the frame 210. The load 240 is to be held in the recess 230. It is to be noted that the substantially rectangular shapes of the frame 210 and the recess 230 are merely exemplary. In general, the frame 210 and the recess 230 may exhibit any desired shape.

The load 240 may, e.g., exhibit a specific shape and/or size that is adapted to the shape and/or size of the recess 230. For example, the load 240 may be a cargo container for carrying one or more goods, or a housing for one or more sensors and associated circuitry.

Further, eight rotors (airscrews) 220 are attached to the frame 210 for propelling the UAV 200. It is to be noted that the number of rotors illustrated in FIG. 2 is merely exemplary and that any number N≥2 may be used. The plurality of rotors 220 allow the UAV 200 to move into any direction and to rotate around the vertical axis.

Figure 3:
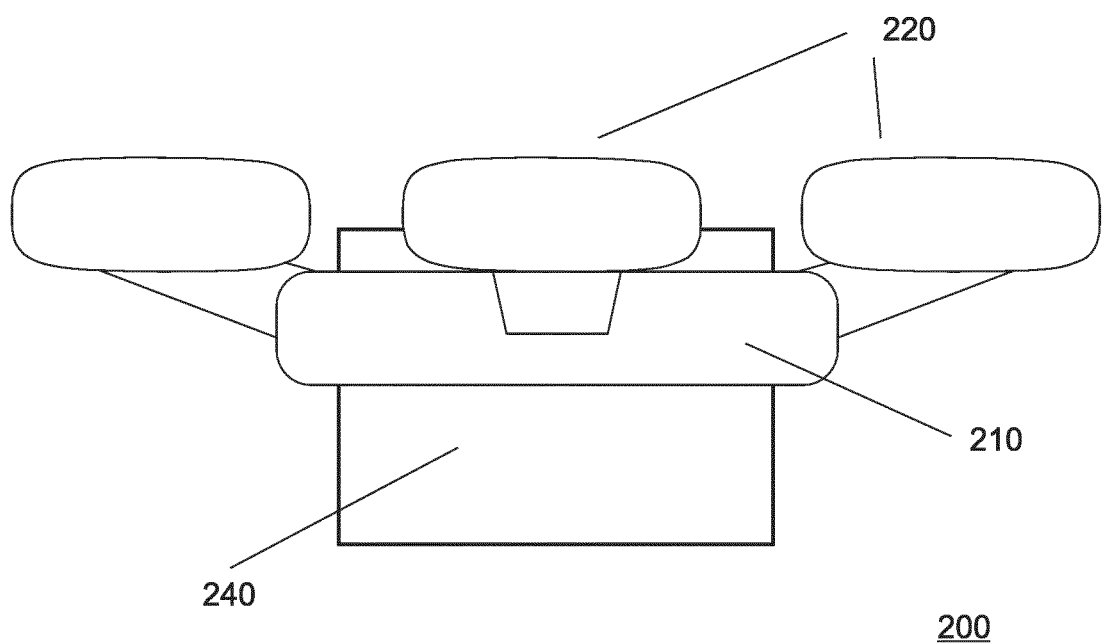
FIG. 3 illustrates a side view of the UAV illustrated in FIG. 2.

Referring back to FIG. 1, method 100 comprises autonomously performing steps 102 to 108 described in the following in-flight (i.e. while the first AV and the second AV are airborne):

In step 102, fastening means (a fastening element or a fastening member) of the first AV hold the load in the vertical opening of the first AV such that a bottom end of the load is accessible by the second AV. The fastening means may be any means suitable for holding and positioning the load. Two exemplary implementations for fastening means will be described later in connection with FIGS. 6 to 9. For example, the fastening means may position the load such along the vertical axis that the bottom end of the load projects from the lower end of the first AV. FIG. 3 exemplary illustrates such a situation for the UAV 200 of FIG. 2. The load 240 is held such by the fastening means (not illustrated) of the UAV 200 that the lower end of the load 240 protrudes from the lower end of the UAV 200. Therefore, the lower end of the load 240 may be accessed by a second AV.

Referring back to FIG. 1, the second AV approaches the first AV from below in step 104 in order to couple a fastening means of the second AV to the bottom end of the load. For example, the second AV may position itself below the first AV and then get closer to the first AV until the fastening means of the second AV couple to the bottom end of the load. The fastening means of the second AV may be identical to the fastening means of the first AV.

Figure 4:
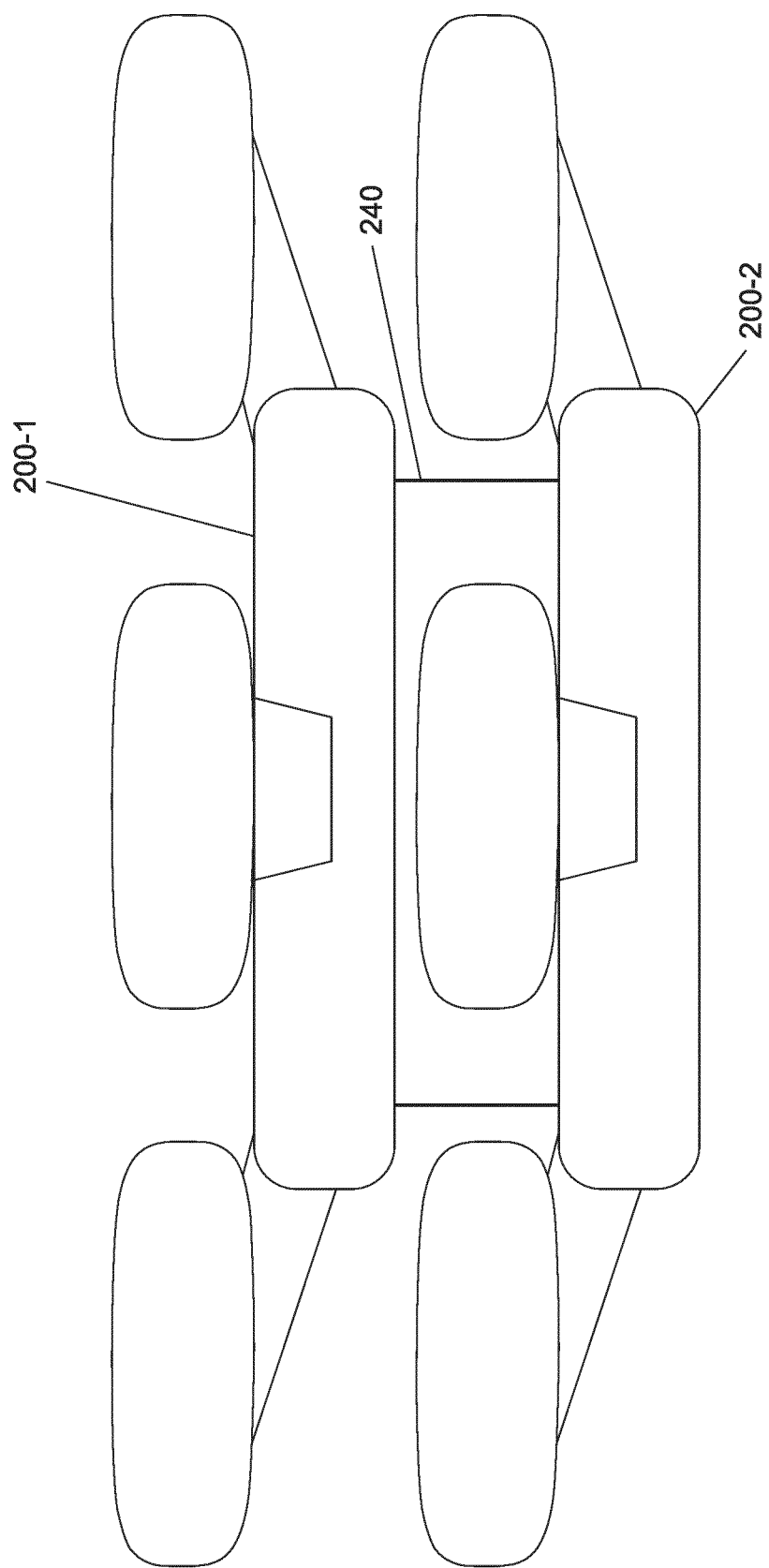
FIG. 4 illustrates an example of a system comprising a first UAV and a second UAV.

FIG. 4 exemplary illustrates an exemplary payload swap system comprising two similar carrier UAVs 200-1 and 200-2 (as described above in connection with FIGS. 2 and 3) during the load swap. The first UAV 200-1 initially holds the load 240. The second UAV 200-2 approaches the first AV 200-1 from below to couple to the protruding bottom end of the load 240.

Referring back to FIG. 1, the fastening means of the first AV releases the load in step 106 after the fastening means of the second AV couples to the bottom end of the load. That is, once the second AV couples to the load, the load is released by the first AV such that only the second AV is carrying the load. For example, in the system of FIG. 4, the first UAV 200-1 releases the load 240 after the second AV 200-2 couples to the bottom end of the load 240.

In step 108, the fastening means of the second AV lower the load with respect to the frame of the second AV in order to move the load into a flight position. After moving the load into the flight position, the second AV is able to start autonomous flight to a destination position (location, region).

Method 100 allows to swap the (pay-)load between the two AVs in mid-flight. In case the load comprises one or more goods to be transported, the travel time may be reduced for distances that are not reachable with a single battery charge or fuel load of one of the two AVs. Conversely, the delivery/travel distance for transporting the load may be extended without increasing, e.g., the battery of one of the two AVs. In case the load is (e.g. unique or expensive) sensing equipment for a sensing task, the sensing task may be continued after the load swap without a significant interruption (only a brief interruption for the swap procedure is required). Hence, method 100 may allow fast and safe transfer of the load from the first AV to the second AV. Method 100 may be repeated several times during the transport of the load or during a sensing task between different AVs. For example, method 100 may be repeated for transferring the load from the second AV to a third AV, from the third AV to a fourth AV, etc. Accordingly, the delivery/travel distance for transporting the load may be further extended.

While some basics of the proposed technique for autonomous in-flight transfer of a load from a first AV to a second AV are described above with reference to method 100, a more detailed example of a method 500 for autonomous in-flight transfer of a load from a first AV to a second AV is described in the following with reference to FIG. 5.

In method 500, it is assumed that the first AV is initially carrying the load and that the second AV is initially not carrying any load. The first AV has requested a load swap. For example, the first AV may request a load swap because its battery level fell below a threshold value or because of a predicted battery depletion. The second AV has been assigned/confirmed to take over the load. For example, a drone management system (platform) may receive the request of the first AV and assign the second AV. Alternatively, the drone management system may forward the request of the first AV, and the second AV may autonomously confirm takeover of the load. Based on the current positon (coordinates) and route of the first drone, a meeting point (rendezvous point) for the load swap is calculated. For example, the drone management system or the second AV may determine the meeting point. For example, the current coordinates and course of the first AV may be sent to the second AV such that the first AV is intercept at a calculated rendezvous point by the second AV.

Similar to what is described above for method 100, the individual steps of method 500 are performed autonomously by the first AV and the second AV in-flight.

When the first AV and the second AV are both close to the rendezvous point, the first AV and the second AV initially establish a communication channel (e.g. via a wireless communication technique such as a wireless local area network, a cellular network, or Bluetooth).

After establishing the communication channel, the second AV is in a state 502 ("Empty Flight") in which the second AV is without load before the load swap procedure. Starting from this state, the second AV sends the first AV a message to signal that the swap procedure can be started ("Ready to dock" signal). The second AV then changes into the state 506 ("Initiate Docking").

The first AV is in a state 504 ("Carry Flight") in which the first AV is with the load before the load swap procedure. Starting from this state, the load swapping procedure is initiated by signaling to the second AV that the docking procedure can start ("Standby for docking" signal). The first AV then changes into the state 508 ("Expect docking").

When in the state 506, the second AV approaches the first AV from below and sends a "Docking in progress" signal to the first AV once it is in physical contact with first AV via the load and changes its state to state 510 ("Move to Pos. B").

In other words, in method 500 the following is performed autonomously in-flight:

1) fastening means of the first AV hold the load in the vertical opening of the first AV such that a bottom end of the load is accessible by the second AV;
2) the second AV signals to the first AV via the communication channel that the second AV is ready to initiate a docking procedure prior to approaching the first AV from below; and
3) after receiving an approval for the docking procedure from the first AV via the communication channel, the second AV approaches the first AV from below in order to couple a fastening means of the second AV to the bottom end of the load.

When in the state 508, the first AV changes its flight control to expect the docking procedure. For example, the rotors may go into a docking mode. In the docking mode, a predetermined sub-set of the rotors is operated at reduced power or turned off, and another subset is operated with increased power. An optional guidance system may be activated. On reception of the "Docking in progress" signal, the first AV changes to state 512 ("Wait 0") as the two AVs are now physically connected via the load.

While the exact relative positioning of the two AVs during the docking, the rotors of the AVs are operated in a coordinated manner. For example, the second AV may deactivate or reduce the power of exactly the opposite rotors than the first AV. The coordinated operation of the rotors of the two AVs allows to reduce the downwind on the active airscrews of the second AV approaching from below. To compensate for the loss of lift, the still active airscrews are operated with increased power. For example, the first AV may signal to the second AV which of its rotors are operated with increased and/or decreased power and/or which rotors are deactivated.

In other words, in method 500 the following is further performed autonomously in-flight:

4) the first AV operates a first sub-set of the plurality of rotors attached to the frame of the first AV at reduced or zero power while the second AV approaches the first AV from below;
5) the first AV operates a second sub-set of the plurality of rotors attached to the frame of the first AV at increased power while the second AV approaches the first AV from below;
6) the first AV signals information about the first sub-set of rotors and the second subset of rotors to the second AV via the communication channel;
7) the second AV operates rotors attached to the frame of the second AV at positions vertically below the second sub-set of rotors of the first AV at reduced or zero power; and
8) the second AV operates rotors attached to the frame of the second AV at positions vertically below the first sub-set of rotors of the first AV at increased power.

In state 510, the second AV moves from its initial coupling position at the bottom end of the load to a docking position B on the load. In position B, the load is safely coupled to the second AV. For moving to position B, the second AV lowers the load with respect to the frame of the second AV. Once position B is reached, this is signaled to the first AV in order to indicate that the second AV is ready to take over the load ("Pos. B reached" signal).

In other words, in method 500 the following is further performed autonomously in-flight:

9) the fastening means of the second AV lower the load with respect to the frame of the second AV after the fastening means of the second AV couples to the bottom end of the load in order to move the load into a docking position; and 10) the second AV signals to the first AV via the communication channel that the second AV is ready to take over the load after the second AV moved the load in the docking position by The first AV is in the state 512 while the second AV is moving to the docking position B. The first AV and the second AV are coupled/interconnected at this point of the load swap procedure. In state 512, the first AV stabilizes the flight of the interconnected system. Once the second AV has reached position B, the first AV signals readiness to swap lift with the second AV ("Ready to swap lift" signal).

In other words, in method 500 the following is further performed autonomously in-flight while the second AV is interconnected to the first AV via the load:

11) the first AV performs flight stabilization of the first AV and the second AV.

Once position B is reached, the second AV moves to state 514 ("Wait 1") and waits for the signal from the first AV to swap lift.

Once the first AV has signaled to the second AV to increase the lift to take over the weight of the load via the "Ready to swap lift" signal, the first AV moves to state 516 ("Hold Altitude") in which it adjusts its own lift to hold the current altitude. The first AV reduces its lift by reducing the power of the plurality of rotors attached to the frame of the first AV (e.g. it reduces the rotation speed of its rotors). The first AV signals to the second AV that the lift swap is complete ("Lift swap complete" signal), once the first AV has reduced the lift to a level at which it carries only its own weight.

Upon reception of the signal from the first AV to swap lift, the second AV moves to state 518 ("Increase Lift") and starts to increase its lift until the first AV signals to stop via the "Lift swap complete" signal. The second AV now generates a lift sufficient for maintaining a current altitude of the second AV while carrying the load. The second AV now takes over responsibility for load stabilization and signals this to the first AV ("Accept responsibility" signal).

After signaling to the second AV that the lift swap is complete via the "Lift swap complete" signal, the first AV moves to state 520 ("Swap Respons."). In state 520, the first AV gives up load stabilization, which is handed over to the second AV. Once the first AV receives the signal from the second AV indicating that the second AV now takes over responsibility for load stabilization, the first AV moves to state 524 ("Undock") for starting the undocking procedure. During the undocking procedure, the fastening means of the first AV may initially lower the load with respect to the frame (i.e. effectively elevate itself with respect to the load). That is, the first AV moves to the top of the load before undocking itself from.

Once the undocking procedure is completed, the first AV signals according information to the second AV ("Undocking complete" signal). Further, the first AV enters state 528 ("Empty Flight") indicating that the AV is without load (similar to the initial state 502 of the second AV). The first AV is now decoupled from the second AV and the load.

In other words, in method 500 the following is further performed autonomously in-flight after the second AV signals to the first AV that the second AV is ready to take over the load:

12) the first AV reduces power of the plurality of rotors attached to the frame of the first AV such that the rotors generate a lift for maintaining a current altitude of only the first AV;

13) the second AV increases power of the plurality of rotors attached to the frame of the second AV such that the rotors generate a lift for maintaining a current altitude of the second AV while carrying the load;

14) the first AV signals to the second AV via the communication channel to take over the load after reducing the power of the rotors such that the rotors generate a lift sufficient for maintaining a current altitude of only the first AV; and 15) the fastening means of the first AV releases the load, wherein prior to releasing the load, the fastening means of the first AV may lower the load with respect to the frame of the first AV.

The second AV moves to state 522 ("Hold Attitude") after signaling to the first AV that it took over the responsibility for load stabilization. In state 522, the second AV holds its altitude/position while the first AV starts to undock from the load.

The second AV then moves to state 526 ("Wait 2") and waits for the first AV to complete the undocking from the load.

Once the first AV has signaled that the undocking is completed via the "Undocking complete" signal, the second AV moves into state 530 for moving the load into a flight position A. For moving the load into the flight position A, the fastening means of the second AV lower the load with respect to the frame of the second AV. In the position A, the center of mass of the load and, hence, the whole system consisting of the second AV and the load is lower such that a better flight stability is achieved. Further, lowering the load is a preparation for an optional further load swap with a third AV. In some alternate examples, the docking position B may be identical to the flight position such that state 530 may be omitted.

After lowering the load, the second AV moves to state 532 ("Carry Flight") indicating that the AV is carrying the load. The load swap cycle is now completed such that the first AV is in the same state as the second AV was before the load swap procedure, and vice versa.

After the decoupling of the first AV from the load, both AVs may again use their rotors independently from each other.

In other words, in method 500 the following is further performed autonomously in-flight after the first AV signals to the second AV to take over the load:

16) the second AV performs flight stabilization of the first AV and the second AV until the fastening means of the first AV releases the load;

17) the second AV maintains the current altitude of the second AV while the fastening means of the first AV releases the load;

18) the first AV signals to the second AV via the communication channel that the fastening means of the first AV released the load; and 19) the second AV subsequently starts to move the load into the flight position.

Figure 5:
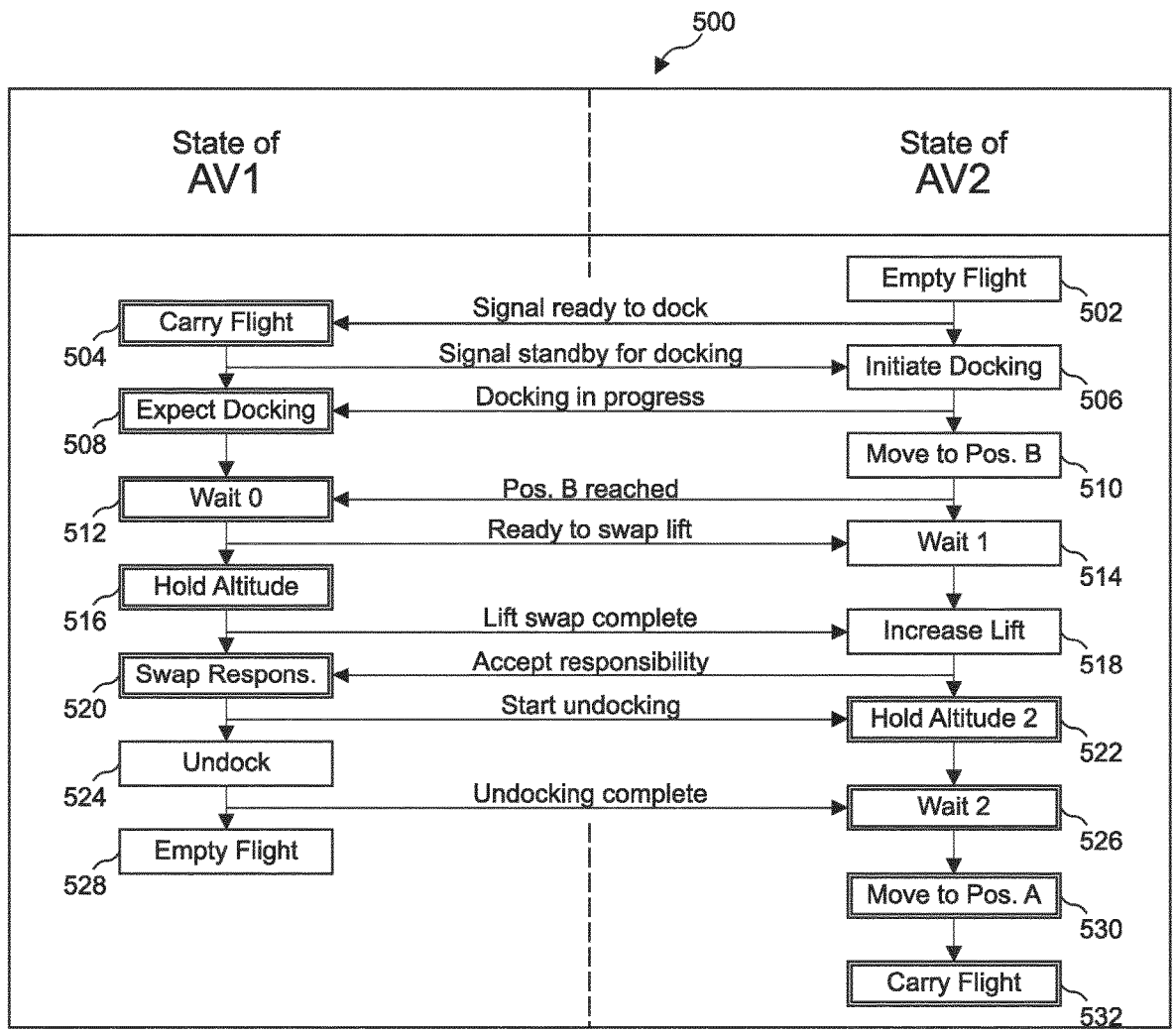
FIG. 5 illustrates a flowchart of another example of a method for autonomous in-flight transfer of a load from a first AV to a second AV.

As can be seen from FIG. 5, the first AV is initially responsible for flight stabilization up to state 520. Then, the second AV takes over responsibility for flight stabilization.

For performing the above described load swap procedures, each of the first AV and the second AV comprises a control circuit configured to control a respective one of the first AV and the second AV to autonomously perform the respective above described steps in-flight. For example, the respective control circuit may be a single dedicated processor, a single shared processor, or a plurality of individual processors, some of which or all of which may be shared, a digital signal processor (DSP) hardware, an application specific integrated circuit (ASIC) or a field programmable gate array (FPGA). Each of the control circuit may optionally be coupled to, e.g., read only memory (ROM) for storing software, random access memory (RAM) and/or non-volatile memory. The AVs may further comprise other hardware—conventional and/or custom.

While the process for autonomous in-flight transfer of a load from a first AV to a second AV is described above in detail, the following paragraphs will focus on the structure of the fastening means of the AVs. In particular, two examples for implementing the fastening means will be described in detail in the following in connection with FIGS. 6a to 9.

Figure 6A:
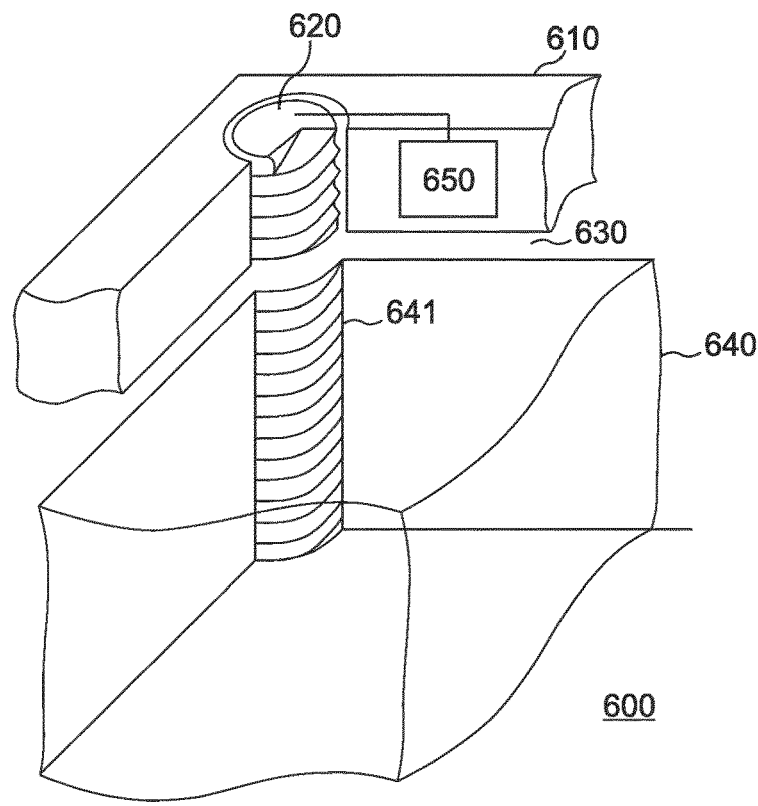
FIG. 6a illustrates a first example in which the fastening means of an AV are implemented using rotatable worm screws.

FIG. 6a illustrates a partial representation of an AV 600 comprising plurality of rotatable worm screws as fastening means. For reasons of simplicity, FIG. 6a merely depicts one rotatable worm screw 620. However, it is to be noted that any number N≥2 of rotatable worm screws may be used.

Similar to the UAV 200 described above, the AV 600 comprises a frame (body) 610 with a vertical opening 630 for receiving a load 640. The opening 630 is formed along the vertical axis in the center of the frame 610. It is to be noted that the substantially rectangular shapes of the frame 610 and the recess 630 are merely exemplary. In general, the frame 610 and the recess 630 may exhibit any desired shape. Although not explicitly illustrated in FIG. 6a, a plurality of rotors is attached to the frame 610 to allow the AV 600 to move into any direction and to rotate around the vertical axis.

As illustrated in FIG. 6a for the exemplary rotatable worm screw 620, the plurality of rotatable worm screws are arranged in the frame such that the rotatable worm screws protrude from side walls of the vertical opening 620. For example, the rotatable worm screws may be arranged in the inner corners of the frame 610, i.e. the corner of the opening 630.

The AV 600 additionally comprises at least one controllable drive 650 (e.g. an electric motor) for the plurality of rotatable worm screws. The at least one drive 650 is configured to rotate the plurality of rotatable worm screws. As illustrated in FIG. 6a for the exemplary rotatable worm screw 620, the at least one drive 650 is mechanically coupled to the plurality of rotatable worm screws.

The load 640 comprises counterparts for engaging with the rotatable worm screws. For reasons of simplicity, only the counterpart for the exemplary rotatable worm screw 620 is illustrated in FIG. 6a. The counterpart for engaging with the rotatable worm screw 620 is a gear rack 641 at an outer vertical surface of the load 640. Since the rotatable worm screw 620 is arranged in a corner of the vertical opening 630, the gear rack 641 is arranged at an outer corner of the load 640. However, it is to be noted that the gear rack 641 need not be arranged at a corner of the load 640. The plurality of gear racks are arranged at positions at the outer vertical surface of the load 640 that correspond to the positions of the plurality of rotatable worm screws at the side walls of the vertical opening 630.

When the plurality of rotatable worm screws engage with the plurality of gear racks, the load is safely coupled to the frame 610 of the AV 600 and, hence, the AV 600. Further, by rotating the plurality of rotatable worm screws, the vertical position of the load 640 with respect to the frame 630 is adjustable. Accordingly, by rotating the plurality of rotatable worm screws the load 640 may be lowered with respect to the frame 630 as in the above described methods for autonomous in-flight transfer of a load. Due to the plurality of gear racks at the load, the position of the load with respect to the frame of the respective one of the first AV and the second AV is adjustable by rotating the plurality of rotatable worm screws of the respective one of the first AV and the second AV in the above described methods.

It is to be noted that the AV 600 may further comprise other hardware—conventional and/or custom. For example, the AV 600 comprise control circuitry, communication circuitry, etc. In particular, the AV 600 may comprise a control circuit configured to control the AV 600 to autonomously perform the method steps above described for one of the first AV and the second AV in-flight. The further elements of the AV 600 may be arranged in the frame 600.

Figure 6B:
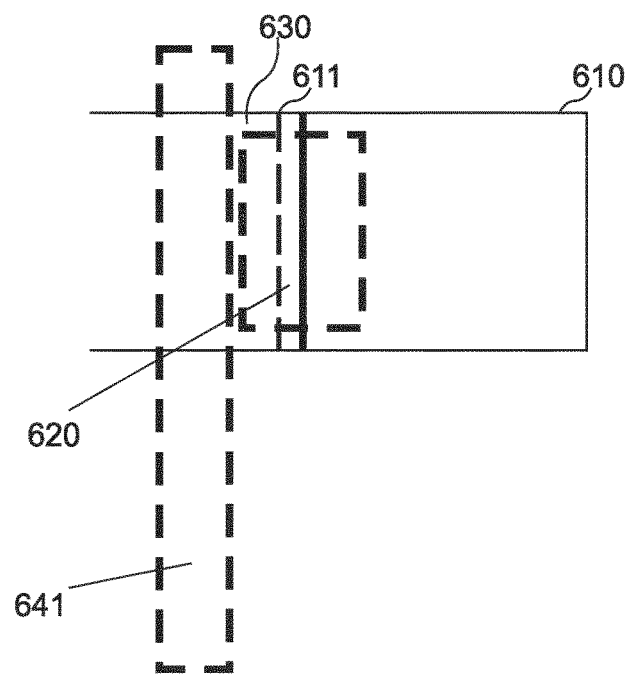
FIG. 6b illustrates a first exemplary fastening means comprising a rotatable worm screw.

FIG. 6b illustrates a side view for illustrating the engagement of the rotatable worm screw 620 and the gear rack 641. As can be seen from FIG. 6b, the rotatable worm screw 620 protrudes from a side wall 611 of the frame 610 into the opening 630 such that the gear rack 641 can directly engage with the worm screw 620.

Figure 6C:
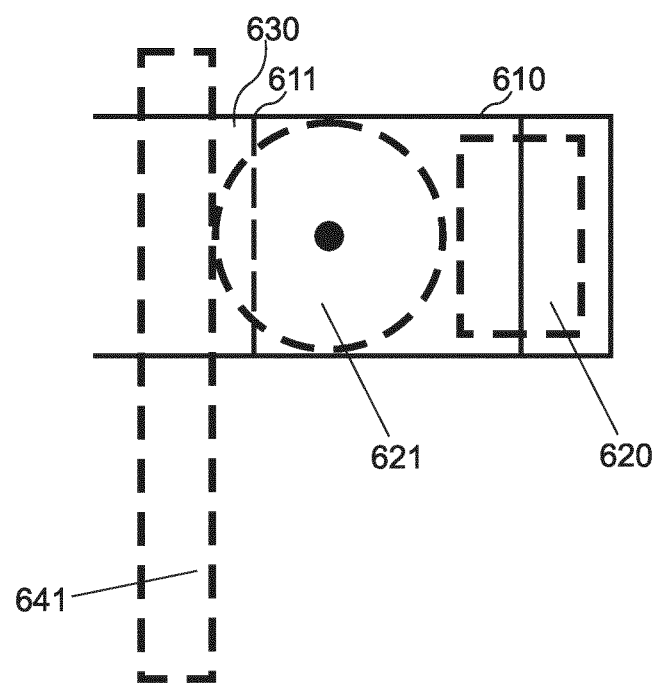
FIG. 6c illustrates a second exemplary fastening means comprising a rotatable worm screw.

An alternative implementation using an additional worm wheel 621 is illustrated in FIG. 6c. The worm wheel 621 is driven (driveable) by the worm screw 620. The worm screw 620 and the worm wheel 621 are both arranged in the frame 610 such that only the worm wheel 621 protrudes from the side wall 611 of the frame 610 into the opening 630. Accordingly, the gear rack 641 (indirectly) engages with the worm screw 620 via the worm wheel 621.

Figure 7:
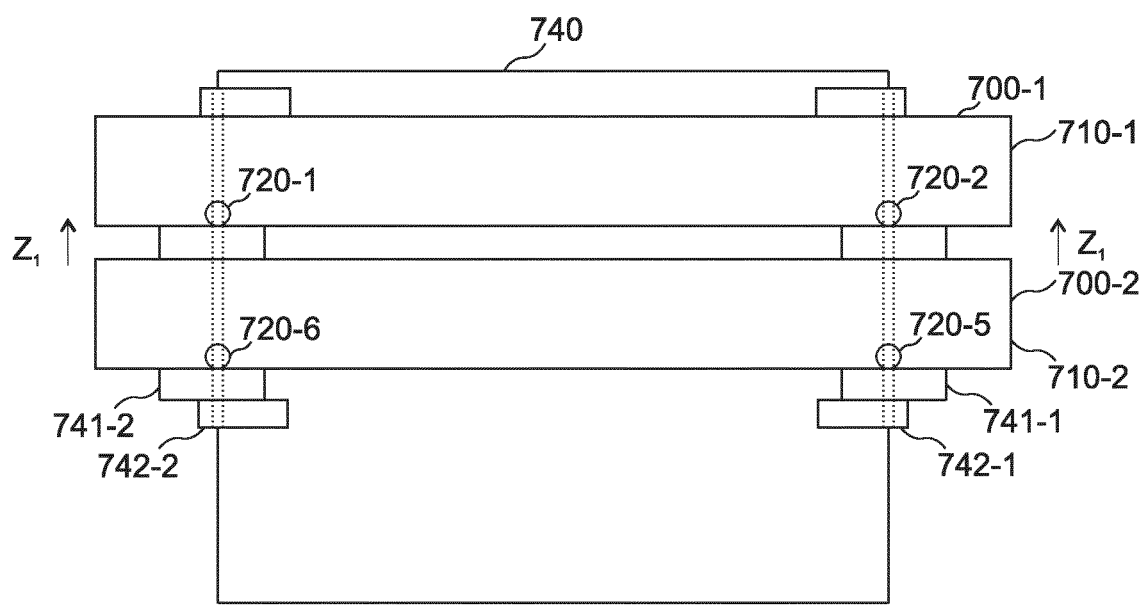
FIG. 7 illustrates a side view of second example in which the fastening means of an AV are implemented as bolts.
Figure 8:
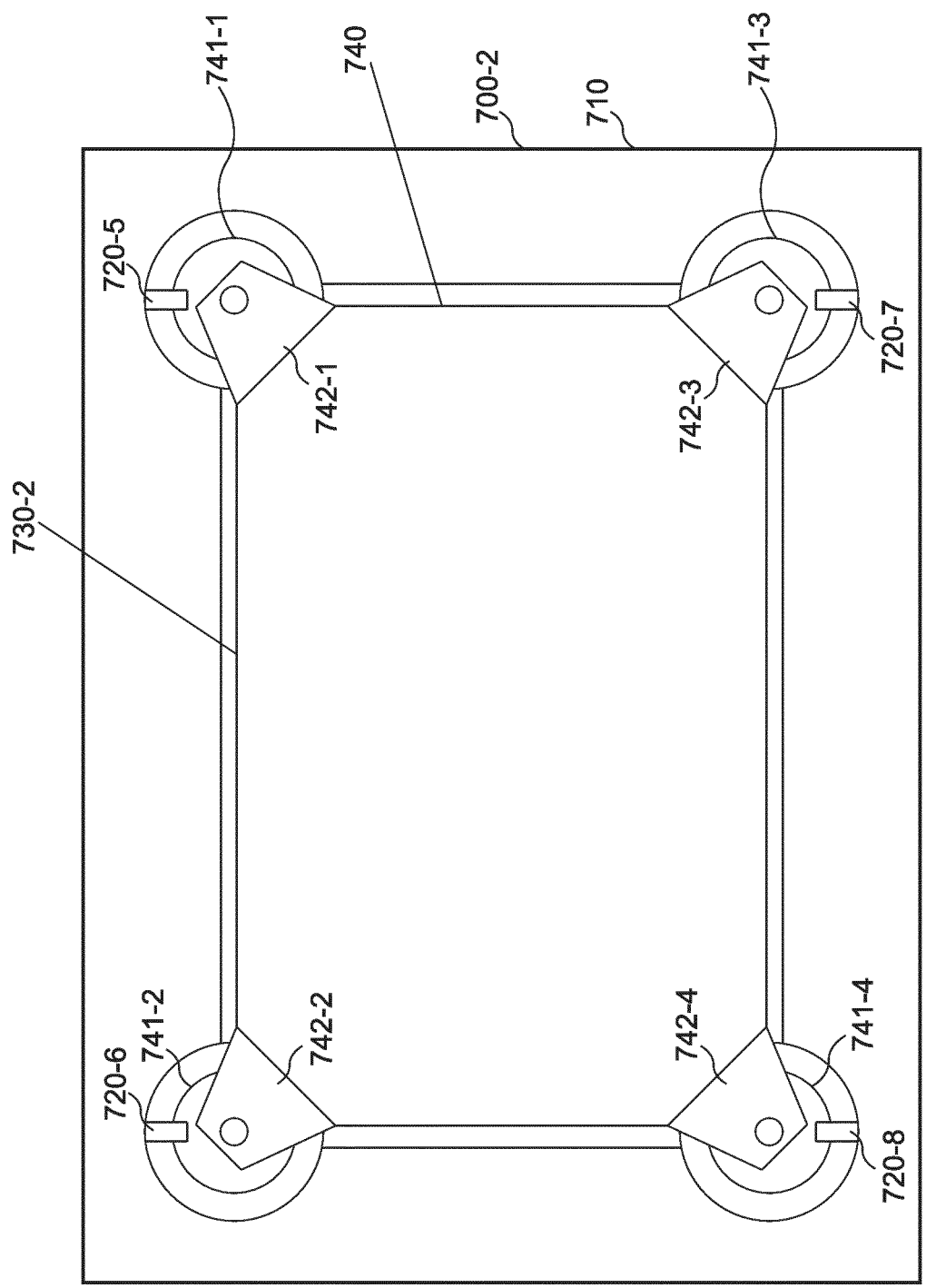
FIG. 8 illustrates a top view of the fastening means illustrated in FIG. 7.
Figure 9:
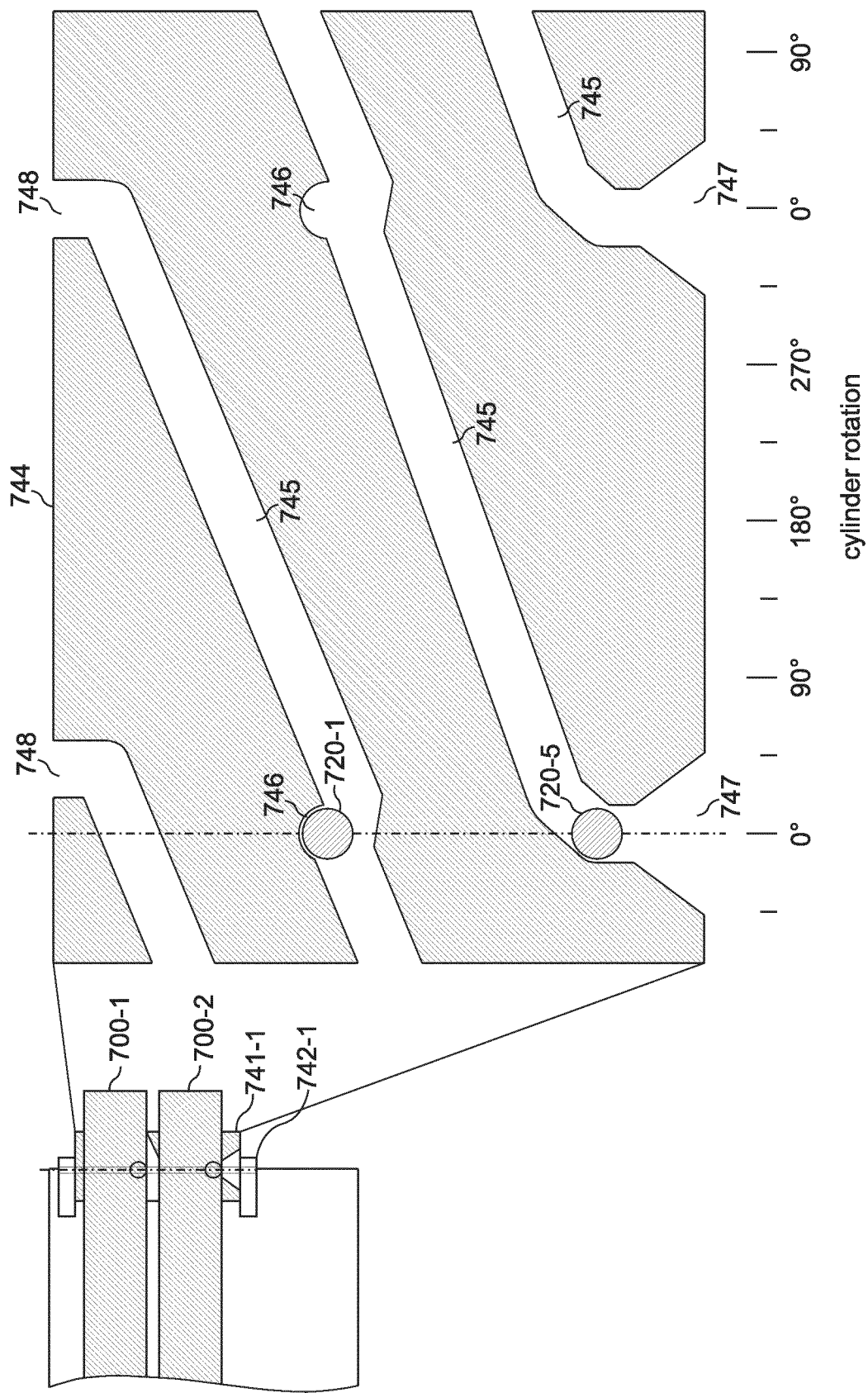
FIG. 9 illustrates an example of an unrolled cylinder surface.

FIGS. 7 to 9 illustrate another exemplary implementation of the fastening means. In the example of FIGS. 7 to 9, the fastening means is implemented by a plurality of bolts. For example, the below described implementation of the fastening means may be used instead of the rotatable worm screws at the AV 600 and the gear racks at the load 640.

FIG. 7 illustrates a side view of a situation in which a first AV 700-1 and a second AV 700-1 couple to a load during a load swap procedure 740 according to the proposed technique.

The first AV 700-1 and the second AV each comprises a plurality of bolts. Due to the side view, only two bolts 720-1 and 720-2 of the first AV 700-1 and two bolts 720-5 and 720-6 of the second AV 700-2 are visible in FIG. 7. The bolts of the first AV 700-1 are attached to side walls of the vertical opening in the frame 710-1 of the first AV 700-1, whereas the bolts of the second AV 700-2 are attached to side walls of the vertical opening 730-2 in the frame 710-2 of the second AV 700-2.

The load 740 comprises a plurality of rotatable cylinders. Due to the side view, only the rotatable cylinders 741-1 and 741-2 are visible in FIG. 7. Each of the plurality of rotatable cylinders is held rotatably by a respective mounting structure (suspension) with respect to the load 740. This may be seen better from FIG. 8, which shows a bottom view of the situation illustrated in FIG. 7. Each of the rotatable cylinders 741-1, 741-2, 741-3 and 741-4 is held rotatably by a respective mounting structure 742-1, 742-2, 742-3 and 742-4 with respect to the load 740.

For reasons of simplicity, FIG. 8 depicts four bolts 720-5, 720-6, 720-7 and 720-8 in the corners of the vertical opening 730-2. However, it is to be noted that any number N≥2 of bolts may be used.

Each of the cylinders 741-1, 741-2, 741-3 and 741-4 comprises a cylinder surface with a circumferential notch for engaging with the bolts of the first AV 700-1 and the second AV 700-1. As indicated in FIG. 8, the bolts 720-5, 720-6, 720-7 and 720-8 of the second AV 700-2 engage with the circumferential notches of the cylinders 741-1, 741-2, 741-3 and 741-4. Similarly, the circumferential notches of the cylinders 741-1, 741-2, 741-3 and 741-4 engage with the bolts of the first AV 700-1 (as indicated by bolts 720-1 and 720-2 in FIG. 7).

The cylinders 741-1, 741-2, 741-3 and 741-4 may be rotated by the second AV 700-2 by applying a force along the cylinder axes via the bolts 720-5, 720-6, 720-7 and 720-8 of the second AV 700-2. The cylinder axes extend along a length direction of the cylinders 741-1, 741-2, 741-3 and 741-4. The cylinder axes $Z_1$ and $Z_2$ of the cylinders 741-1 and 741-2 are exemplarily illustrated in FIG. 7.

When the second AV 700-2 approaches the load from below, the bolts 720-5, 720-6, 720-7 and 720-8 of the second AV 700-2 engage with the circumferential notches of the cylinders 741-1, 741-2, 741-3 and 741-4 and exert a force in the vertical direction, i.e. along the cylinder axes, on the cylinders 741-1, 741-2, 741-3 and 741-4. The circumferential notches of the cylinders 741-1, 741-2, 741-3 and 741-4 are formed such that upon applying the force on the cylinders 741-1, 741-2, 741-3 and 741-4, the cylinders 741-1, 741-2, 741-3 and 741-4 start to rotate. Further, the circumferential notches of the cylinders 741-1, 741-2, 741-3 and 741-4 are formed such that the bolts 720-5, 720-6, 720-7 and 720-8 of the second AV 700-2 engage with the notches in a coupling position. Further, the circumferential notches of the cylinders 741-1, 741-2, 741-3 and 741-4 are formed such that the bolts of the first AV 700-1 are released from the notches due to the rotation of the cylinders 741-1, 741-2, 741-3 and 741-4.

Accordingly, the load 740, which is initially secured to the first AV 700-1 via the bolts of the first AV 700-1 and the circumferential notches of the cylinders 741-1, 741-2, 741-3 and 741-4, may be decoupled from the first AV 700-1 and secured to the second AV 700-1 via the bolts 720-5, 720-6, 720-7 and 720-8 of the second AV 700-2 and the circumferential notches of the cylinders 741-1, 741-2, 741-3 and 741-4.

An exemplary shape of a circumferential notch is exemplarily illustrated in FIG. 9 for the cylinder 741-1. FIG. 9 illustrates the cylinder surface 744 of the cylinder 741-1 unrolled for highlighting the shape of the circumferential notch 745. In FIG. 9, the cylinder surface 744 is unrolled more than one evolution such that the right part of FIG. 9 and the left part of FIG. 9 show the identical part of the cylinder surface 744. It is to be noted that the circumferential notches in the plurality of rotatable cylinders may in some examples exhibit a shape/form different from what is illustrated in FIG. 9 to implement the above described functionality.

The bolt 720-1 of the first AV 700-1 initially engages with the circumferential notch 745 in a coupling position due to the vertical recess 746 in the circumferential notch 745.

When the second AV 700-2 approaches the load 740 from below, the bolt 720-5 enters the circumferential notch 745 at an (e.g. funnel shaped) entrance portion 747. Due to the vertically rising course of the circumferential notch 745, the cylinder 741-1 starts to rotate if the second AV 700-2 and, hence, the bolt 720-1 continuously applies a force along the cylinder axis $Z_1$. As a consequence, the bolt 720-1 of the first AV 700-1 moves out of the vertical recess 746 in the circumferential notch 745 and moves towards an exit portion 748 of the circumferential notch 745 such that the load 740 is decoupled from the first AV 700-1. On the other hand, the bolt 720-5 of the second AV 700-2 moves towards the vertical recess 746 in the circumferential notch 745 such that the bolt 720-5 of the second AV 700-2 engages with the first circumferential notch 745 in a coupling position (which is the flight position of the load 740).

The bolts of the first AV 700-1 and the second AV 700-2 slide along the respective circumferential notch while the cylinders 741-1, 741-2, 741-3 and 741-4 rotate.

When the bolts of an AV engage with the circumferential notches of the rotatable cylinders in a coupling position, the load is safely coupled to the frame. Further, the vertical position of the load with respect to the AV's frame is adjustable due to the vertically rising shape of the circumferential notches.

If bolts and cylinders as described above in connection with FIGS. 7 to 9 are used for the mechanical coupling of the AV and the load, the individual states of method 500 illustrated in FIG. 5 are adapted as follows:

In state 506 ("Initiate Docking"), the second AV approaches the first AV from below until the bolts enter the entrance portions (e.g. entrance portion 747 illustrated in FIG. 9) of the circumferential notches in the cylinders of the load. The second AV then sends the "Docking in progress" signal to the first AV and change to state 510 ("Move to Pos. B").

Position B in state 510 refers to the bolts first having mechanical contact with the cylinders such that they can apply at least some vertical force to the cylinders (force along the cylinder axes) for reaching the coupling positions.

State 530 ("Move to Pos. A") may be omitted, skipped or just proceeded without action to state 532, since the second AV is already in position A (i.e. the coupling position) due to the cylinder mechanics.

In state 524 ("Undock"), the second AV descends vertically. No further mechanical undocking is necessary as this is implicitly achieved when the cylinder rotates in state 518. By the end of state 518, the bolts are located at the exit portions (e.g. exit portion 748 illustrated in FIG. 9) of the circumferential notches in the cylinders of the load. The bolts may, hence, be extracted by just moving upwards.

The AVs described above may, e.g., be UAVs such as multirotor drones.

The following examples pertain to further embodiments:

(1) A method for autonomous in-flight transfer of a load from a first AV to a second AV, wherein each of the first AV and the second AV comprises a frame with a vertical opening for receiving the load, wherein a plurality of rotors are attached to the frame, the method comprising autonomously performing the following in-flight:

fastening means of the first AV hold the load in the vertical opening of the first AV such that a bottom end of the load is accessible by the second AV;

the second AV approaches the first AV from below in order to couple a fastening means of the second AV to the bottom end of the load;

the fastening means of the first AV releases the load after the fastening means of the second AV couples to the bottom end of the load; and the fastening means of the second AV lower the load with respect to the frame of the second AV in order to move the load into a flight position.

(2) The method of (1), wherein the method further comprises autonomously performing the following in-flight:
the first AV and the second AV initially establish a communication channel.

(3) The method of (2), wherein the method further comprises autonomously performing the following in-flight:
the second AV signals to the first AV via the communication channel that the second AV is ready to initiate a docking procedure prior to approaching the first AV from below,
wherein the second AV approaches the first AV from below after receiving an approval for the docking procedure from the first AV via the communication channel.

(4) The method of (3), wherein the method further comprises autonomously performing the following in-flight:
the first AV operates a first sub-set of the plurality of rotors attached to the frame of the first AV at reduced or zero power while the second AV approaches the first AV from below;
the first AV operates a second sub-set of the plurality of rotors attached to the frame of the first AV at increased power while the second AV approaches the first AV from below; and
the first AV signals information about the first sub-set of rotors and the second sub-set of rotors to the second AV via the communication channel.

(5) The method of (4), wherein the method further comprises autonomously performing the following in-flight:
the second AV operates rotors attached to the frame of the second AV at positions vertically below the second sub-set of rotors of the first AV at reduced or zero power; and
the second AV operates rotors attached to the frame of the second AV at positions vertically below the first sub-set of rotors of the first AV at increased power.

(6) The method of (4) or (5), wherein the method further comprises autonomously performing the following in-flight:
the fastening means of the second AV lower the load with respect to the frame of the second AV after the fastening means of the second AV couples to the bottom end of the load in order to move the load into a docking position.

(7) The method of (6), wherein the method further comprises autonomously performing the following in-flight while the second AV is interconnected to the first AV via the load: the first AV performs flight stabilization of the first AV and the second AV.

(8) The method of (6) or (7), wherein the method further comprises autonomously performing the following in-flight after the load is moved in the docking position by the second AV:
the second AV signals to the first AV via the communication channel that the second AV is ready to take over the load.

(9) The method of (8), wherein the method further comprises autonomously performing the following in-flight after the second AV signals to the first AV that the second AV is ready to take over the load:
the first AV reduces power of the plurality of rotors attached to the frame of the first AV such that the rotors generate a lift for maintaining a current altitude of only the first AV; and
the second AV increases power of the plurality of rotors attached to the frame of the second AV such that the rotors generate a lift for maintaining a current altitude of the second AV while carrying the load.

(10) The method of (9), wherein the method further comprises autonomously performing the following in-flight after reducing the power of the rotors such that the rotors generate a lift sufficient for maintaining a current altitude of only the first AV:
the first AV signals to the second AV via the communication channel to take over the load; and
the fastening means of the first AV releases the load.

(11) The method of (10), wherein the fastening means of the first AV lowers the load with respect to the frame of the first AV prior to releasing the load.

(12) The method of (10) or (11), wherein the method further comprises autonomously performing the following in-flight after the first AV signals to the second AV to take over the load:
the second AV performs flight stabilization of the first AV and the second AV until the fastening means of the first AV releases the load.

(13) The method of (12), wherein the method further comprises autonomously performing the following in-flight:
the second AV maintains the current altitude of the second AV while the fastening means of the first AV releases the load.

(14) The method of (13), wherein the method further comprises autonomously performing the following in-flight:
the first AV signals to the second AV via the communication channel that the fastening means of the first AV released the load; and/or
the second AV subsequently starts to move the load into the flight position.

(15) The method of any of (1) to (14), wherein each of the fastening means of the first AV and the second AV comprises a plurality of rotatable worm screws arranged in the frame of a respective one of the first AV and the second AV, and wherein the load comprises a plurality of gear racks for engaging with the plurality of rotatable worm screws of the first AV and the second AV such that a position of the load with respect to the frame of the respective one of the first AV and the second AV is adjustable by rotating the plurality of rotatable worm screws of the respective one of the first AV and the second AV.

(16) The method of any (1) to (14), wherein each of the fastening means of the first AV and the second AV comprises a plurality of bolts, wherein the load comprises a plurality of rotatable cylinders, wherein the plurality of cylinders each comprise a cylinder surface with a circumferential notch for engaging with the plurality of bolts of the first AV and the second AV such that the cylinders may be rotated by the second AV by applying a force along the cylinder axes via the bolts of the second AV, and wherein the bolts of the second AV engage with the notches in a coupling position and the bolts of the first AV are released from the notches upon rotation of the cylinders.

(17) A system comprising a first AV and a second AV, wherein each of the first AV and the second AV comprises a frame with a vertical opening for receiving a load, wherein a plurality of rotors are attached to the frame, wherein each of the first AV and the second AV comprises a control circuit configured to control a respective one of the first AV and the second AV to autonomously perform the following in-flight:
fastening means of the first AV hold the load in the vertical opening of the first AV such that a bottom end of the load is accessible by the second AV;
the second AV approaches the first AV from below in order to couple a fastening means of the second AV to the bottom end of the load;
the fastening means of the first AV releases the load after the fastening means of the second AV couples to the bottom end of the load; and the fastening means of the second AV lower the load with respect to the frame of the second AV in order to move the load into a flight position.

(18) An AV, comprising:
a frame with a vertical opening for receiving a load;
a plurality of rotors attached to the frame;
a plurality of rotatable worm screws arranged in the frame, wherein the worm screws are capable of engaging with a plurality of gear racks of the load for securing the load; and
at least one controllable drive for the plurality of rotatable worm screws, wherein the drive is configured to rotate the plurality of rotatable worm screws for adjusting a vertical position of the load with respect to the frame.

(19) An AV, comprising:
a frame with a vertical opening for receiving a load;
a plurality of rotors attached to the frame; and
a plurality of bolts attached to side walls of the vertical opening, wherein the bolts are capable of engaging with a respective notch in cylinder surfaces of a plurality of cylinders of the load for securing the load, wherein the cylinders of the load are rotatable by the bolts by applying a force along the cylinder axes.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in non-transitory machine readable medium (e.g. a floppy disc, a DVD, a Blu-Ray, a CD, a ROM, a PROM, and EPROM, an EEPROM or a FLASH memory) and so executed by a processor or a programmable hardware, whether or not such processor or a programmable hardware is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for autonomous in-flight transfer of a load from a first Aerial Vehicle (AV) to a second AV, wherein each of the first AV and the second AV comprises a frame with a vertical opening to receive the load, wherein a plurality of rotors are attached to the frame, the method comprising autonomously performing the following in-flight:
transmitting, from the first AV to a management system, a request to transfer the load to another AV, the second AV being selected based on the request from the first AV;
establishing a wireless local area network (WLAN) communication channel between the first AV and the second AV upon arrival of the first AV and the second AV at a predetermined rendezvous location;
holding, with a fastener of the first AV, the load in a vertical opening of the first AV such that a bottom end of the load is accessible by the second AV;
approaching the first AV from below by the second AV to couple a fastener of the second AV to the bottom end of the load;
causing the fastener of the first AV to release the load after the fastener of the second AV couples to the bottom end of the load; and
lowering, with the fastener of the second AV, lower the load with respect to the frame of the second AV to move the load into a flight position.

2. The method of claim 1, wherein the method further comprises autonomously performing the following in-flight:
signaling from the second AV to the first AV via the communication channel that the second AV is ready to initiate a docking procedure prior to approaching the first AV from below, wherein the second AV approaches the first AV from below after receiving an approval for the docking procedure from the first AV via the communication channel.

3. The method of claim 2, wherein the method further comprises autonomously performing the following in-flight:
operating, by the first AV, a first sub-set of the plurality of rotors attached to the frame of the first AV at reduced or zero power while the second AV approaches the first AV from below;
operating, by the first AV, a second sub-set of the plurality of rotors attached to the frame of the first AV at increased power while the second AV approaches the first AV from below; and
signaling, from the first AV, information about the first sub-set of rotors and the second sub-set of rotors to the second AV via the communication channel.

4. The method of claim 3, wherein the method further comprises autonomously performing the following in-flight:
operating, by the second AV, rotors attached to the frame of the second AV at positions vertically below the second sub-set of rotors of the first AV at reduced or zero power; and operating, by the second AV, rotors attached to the frame of the second AV at positions vertically below the first sub-set of rotors of the first AV at increased power.

5. The method of claim 3, wherein the method further comprises autonomously performing the following in-flight:
lowering, by the fastener of the second AV, the load with respect to the frame of the second AV after the fastener of the second AV couples to the bottom end of the load to move the load into a docking position.

6. The method of claim 5, wherein the method further comprises autonomously performing in-flight while the second AV is interconnected to the first AV via the load, stabilizing by the first AV, the first AV and the second AV.

7. The method of claim 5, wherein the method further comprises autonomously performing in-flight after the load is moved in the docking position by the second AV, signaling by the second AV to the first AV via the communication channel that the second AV is ready to take over the load.

8. The method of claim 7, wherein the method further comprises autonomously performing in-flight after the second AV signals to the first AV that the second AV is ready to take over the load,
reducing, by the first AV, power of the plurality of rotors attached to the frame of the first AV such that the rotors generate a lift for maintaining a current altitude of only the first AV; and
increasing, by the second AV, power of the plurality of rotors attached to the frame of the second AV such that the rotors generate a lift for maintaining a current altitude of the second AV while carrying the load.

9. The method of claim 8, wherein the method further comprises autonomously performing in-flight after reducing the power of the rotors such that the rotors generate a lift sufficient for maintaining a current altitude of only the first AV:
signaling by the first AV to the second AV via the communication channel to take over the load; and
causing the fastener of the first AV to release the load.

10. The method of claim 9, wherein the fastener of the first AV lowers the load with respect to the frame of the first AV prior to releasing the load.

11. The method of claim 9, wherein the method further comprises autonomously performing in-flight after the first AV signals to the second AV to take over the load:
performing by the second AV flight stabilization of the first AV and the second AV until the fastener of the first AV releases the load.

12. The method of claim 11, wherein the method further comprises autonomously performing in-flight maintaining, by the second AV, the current altitude of the second AV while the fastener of the first AV releases the load.

13. The method of claim 12, wherein the method further comprises autonomously performing in-flight:
signaling by the first AV to the second AV via the communication channel that the fastener of the first AV released the load; and/or
subsequently starting, by the second AV, to move the load into the flight position.

14. The method of claim 1, wherein each of the fasteners of the first AV and the second AV comprises a plurality of rotatable worm screws arranged in the frame of a respective one of the first AV and the second AV, and wherein the load comprises a plurality of gear racks to engage with the plurality of rotatable worm screws of the first AV and the second AV such that a position of the load with respect to the frame of the respective one of the first AV and the second AV is adjustable by rotating the plurality of rotatable worm screws of the respective one of the first AV and the second AV.

15. The method of claim 1, wherein each of the fasteners of the first AV and the second AV comprises a plurality of bolts, wherein the load comprises a plurality of rotatable cylinders, wherein the plurality of cylinders each comprise a cylinder surface with a circumferential notch to engage with the plurality of bolts of the first AV and the second AV such that the cylinders may be rotated by the second AV by applying a force along the cylinder axes via the bolts of the second AV, and wherein the bolts of the second AV engage with the notches in a coupling position and the bolts of the first AV are released from the notches upon rotation of the cylinders.

16. The method according to claim 1, wherein the load includes a cargo container to carry goods.

17. A system comprising a first Aerial Vehicle (AV), a second AV, and an AV management system, wherein each of the first AV and the second AV comprises a frame with a vertical opening for receiving a load, wherein a plurality of rotors are attached to the frame, wherein each of the first AV and the second AV comprises a control circuit configured to control a respective one of the first AV and the second AV to autonomously perform the following in-flight:
cause the first AV to request transfer of the load by sending a request to the AV management system, the AV management system selecting the second AV based on the request;
cause the first AV and the second AV to establish a wireless local area network (WLAN) communication channel between the first AV and the second AV upon arrival of the first AV and the second AV at a predetermined rendezvous location;
cause a fastener of the first AV to hold the load in the vertical opening of the first AV such that a bottom end of the load is accessible by the second AV;
cause the second AV to approach the first AV from below to couple a fastener of the second AV to the bottom end of the load;
cause the fastener of the first AV to release the load after the fastener of the second AV couples to the bottom end of the load; and
cause the fastener of the second AV to lower the load with respect to the frame of the second AV to move the load into a flight position.

18. An aerial vehicle (AV), comprising:
a frame with a vertical opening to receive a load from another AV;
a plurality of rotors attached to the frame;
a plurality of rotatable worm screws arranged in the frame to engage with a plurality of gear racks of the load to secure the load;
at least one controllable drive for the plurality of rotatable worm screws configured to rotate the plurality of rotatable worm screws to adjust a vertical position of the load with respect to the frame; and
processing circuitry configured to
send a response to control transfer of the load from the other AV in response to a request from the other AV to transfer the load, the request from the other AV being sent to a management system, the management system selecting the AV for load transfer based on receipt of the request, and establish a wireless local area network (WLAN) communication channel with the other AV upon arrival of the AV and the other AV at a predetermined rendezvous location.

19. An aerial vehicle (AV), comprising:
a frame with a vertical opening to receive a load from another AV;
a plurality of rotors attached to the frame;
a plurality of bolts attached to side walls of the vertical opening to engage with a respective notch in cylinder surfaces of a plurality of cylinders of the load to secure the load, wherein the cylinders of the load are rotatable by the bolts by applying a force along the cylinder axes; and
processing circuitry configured to
send a response to control transfer of the load from the other AV in response to a request from the other AV to transfer the load, the request from the other AV being sent to a management system, the management system selecting the AV for load transfer based on receipt of the request, and
establish a wireless local area network (WLAN) communication channel with the other AV upon arrival of the AV and the other AV at a predetermined rendezvous location.

* * * * *